(12) United States Patent
Smedberg et al.

(10) Patent No.: US 9,706,011 B2
(45) Date of Patent: Jul. 11, 2017

(54) PERSONALIZED REAL ESTATE EVENT FEED

(71) Applicant: REDFIN CORPORATION, Seattle, WA (US)

(72) Inventors: Michael Smedberg, Oakland, CA (US); Jennifer Chao, San Francisco, CA (US); Robert Gay, San Francisco, CA (US); Jason Wain, Marlboro, NJ (US)

(73) Assignee: REDFIN CORPORATION, Seattle, WA (US)

( * ) Notice: Subject to any disclaimer, the term of this patent is extended or adjusted under 35 U.S.C. 154(b) by 0 days.

(21) Appl. No.: 14/046,833

(22) Filed: Oct. 4, 2013

(65) Prior Publication Data
US 2014/0344112 A1    Nov. 20, 2014

Related U.S. Application Data (60) Provisional application No. 61/710,606, filed on Oct. 5, 2012.

(51) Int. Cl.
| | |
|---|---|
| G06Q 30/06 | (2012.01) |
| H04L 29/06 | (2006.01) |
| G06Q 50/16 | (2012.01) |
| G06Q 10/10 | (2012.01) |
| G06F 7/06 | (2006.01) |
| G06Q 30/02 | (2012.01) |
| G06F 17/22 | (2006.01) |
| H04W 4/02 | (2009.01) |

(Continued)

(52) U.S. Cl.
CPC ............ *H04L 67/42* (2013.01); *G06F 7/06* (2013.01); *G06F 17/2235* (2013.01); *G06F 17/2247* (2013.01); *G06F 17/30* (2013.01); *G06Q 10/1095* (2013.01); *G06Q 30/0257* (2013.01); *G06Q 30/0613* (2013.01); *G06Q 30/0623* (2013.01); *G06Q 50/16* (2013.01); *H04L 67/02* (2013.01); *H04W 4/028* (2013.01)

(58) Field of Classification Search
CPC .................................. G06Q 30/06; G06F 7/06
USPC ............................. 705/26.1, 27; 707/5, 946
See application file for complete search history.

(56) References Cited

U.S. PATENT DOCUMENTS

| | | |
|---|---|---|
| 5,032,989 A | 7/1991 | Tornetta |
| 5,844,570 A | 12/1998 | Curtright et al. |
| 5,884,216 A | 3/1999 | Shah et al. |

(Continued)

*Primary Examiner* — Mila Airapetian
(74) *Attorney, Agent, or Firm* — Foster Pepper PLLC; P. G. Scott Born (57) ABSTRACT

A personalized feed system is described herein that provides feeds that are tailored to the preferences of each user of a real estate website or application. A user signs up to receive a stored profile with the website, and the profile includes information such as what geographical regions the buyer is interested in, what types of homes the buyer is looking for, and so on. The personalized feed system uses this information to provide a feed specific to the buyer that notifies the buyer of listings that are of particular relevance to that buyer. The personalized feed system summarizes other real estate events that are relevant to the user in a single time-oriented feed. Buyers receive information about new and/or modified listings, sales, outstanding offers, status of a transaction, and the like, while sellers receive information about sales, new and/or modified listings, open offers, and so on.

20 Claims, 4 Drawing Sheets

(51) Int. Cl.
*G06F 17/30* (2006.01)
*H04L 29/08* (2006.01)

(56) References Cited

U.S. PATENT DOCUMENTS

| | | | |
|---|---|---|---|
| 6,058,369 A | 5/2000 | Rothstein | |
| 6,684,196 B1 | 1/2004 | Mini et al. | |
| 6,839,880 B1 | 1/2005 | Morse et al. | |
| 6,882,313 B1 | 4/2005 | Fan et al. | |
| 6,883,002 B2 | 4/2005 | Faudman | |
| 7,085,650 B2 | 8/2006 | Anderson | |
| 7,212,670 B1 | 5/2007 | Rousselle et al. | |
| 7,283,909 B1 | 10/2007 | Olsen et al. | |
| 7,346,519 B2 | 3/2008 | Carr et al. | |
| 2001/0037273 A1 | 11/2001 | Greenlee | |
| 2001/0039506 A1 | 11/2001 | Robbins | |
| 2002/0010572 A1 | 1/2002 | Orton et al. | |
| 2002/0046077 A1 | 4/2002 | Mozayeny et al. | |
| 2002/0049624 A1 | 4/2002 | Raveis | |
| 2002/0052814 A1* | 5/2002 | Ketterer | G06Q 40/00 705/35 |
| 2002/0087389 A1 | 7/2002 | Sklarz et al. | |
| 2002/0128857 A1 | 9/2002 | Lee | |
| 2002/0133374 A1 | 9/2002 | Agoni et al. | |
| 2002/0138485 A1 | 9/2002 | Faudman | |
| 2003/0011599 A1 | 1/2003 | Du | |
| 2003/0040934 A1 | 2/2003 | Skidmore et al. | |
| 2003/0101063 A1 | 5/2003 | Sexton et al. | |
| 2003/0140064 A1 | 7/2003 | Klein | |
| 2003/0158786 A1 | 8/2003 | Yaron et al. | |
| 2003/0204406 A1 | 10/2003 | Reardon et al. | |
| 2004/0008866 A1 | 1/2004 | Rhoads et al. | |
| 2004/0030616 A1 | 2/2004 | Florance et al. | |
| 2004/0039629 A1 | 2/2004 | Hoffman et al. | |
| 2004/0044696 A1 | 3/2004 | Frost | |
| 2004/0046798 A1 | 3/2004 | Alen | |
| 2004/0049406 A1 | 3/2004 | Muncaster et al. | |
| 2004/0088172 A1 | 5/2004 | Baglioni | |
| 2004/0098284 A1 | 5/2004 | Petito et al. | |
| 2004/0119759 A1 | 6/2004 | Barros | |
| 2004/0167797 A1 | 8/2004 | Goncalves | |
| 2004/0172418 A1 | 9/2004 | Dorum et al. | |
| 2004/0220906 A1 | 11/2004 | Gargi et al. | |
| 2004/0243533 A1 | 12/2004 | Dempster et al. | |
| 2004/0249705 A1 | 12/2004 | Spencer et al. | |
| 2005/0004927 A1 | 1/2005 | Singer | |
| 2005/0010423 A1 | 1/2005 | Bagbey et al. | |
| 2005/0049953 A1 | 3/2005 | Vu | |
| 2005/0080723 A1 | 4/2005 | Burchetta et al. | |
| 2005/0096926 A1 | 5/2005 | Eaton et al. | |
| 2005/0125237 A1 | 6/2005 | Harrison | |
| 2005/0192930 A1 | 9/2005 | Hightower et al. | |
| 2005/0195219 A1 | 9/2005 | Hirono | |
| 2005/0203671 A1 | 9/2005 | Mertins et al. | |
| 2005/0203768 A1 | 9/2005 | Florance et al. | |
| 2005/0240448 A1 | 10/2005 | Smith | |
| 2005/0273346 A1 | 12/2005 | Frost | |
| 2005/0273354 A1 | 12/2005 | Adams | |
| 2005/0288958 A1 | 12/2005 | Eraker et al. | |
| 2006/0174209 A1 | 8/2006 | Barros | |
| 2007/0094365 A1* | 4/2007 | Nussey | G06F 17/30867 709/223 |
| 2008/0097767 A1 | 4/2008 | Milman et al. | |
| 2008/0126476 A1* | 5/2008 | Nicholas et al. | 709/203 |
| 2008/0133423 A1 | 6/2008 | Adiga et al. | |
| 2008/0262945 A1* | 10/2008 | Clark | G06F 17/30917 705/26.62 |
| 2011/0010302 A1 | 1/2011 | Faudman | |

* cited by examiner

PERSONALIZED REAL ESTATE EVENT FEED

PRIORITY CLAIM

The present application claims priority from U.S. Provisional Application No. 61/710,606, filed Oct. 5, 2012, which is incorporated by reference as if fully set forth herein.

BACKGROUND

Real estate transactions often involve a buyer, a seller, one or more agents (e.g., a listing agent for the seller and buyer's agent for the buyer), and numerous service providers (e.g., escrow professionals, appraisers, home inspectors, lenders, and so forth). In a typical purchase transaction, the seller lists a property using a listing server, often through a listing agent, while buyers go through a search process to identify potential properties to buy. Once the buyer identifies a property the buyer wants to buy, the buyer makes an offer to the seller, potentially each through their respective agents. The seller may either accept the offer, counteroffer at a different price or other terms, or reject the offer. Once an offer or counteroffer has been accepted, the transaction is typically considered pending and on the way to closing pending inspections, resolving various contingencies, securing funds from a lender, and so forth.

Because of the many events and parties involved in a real estate transaction, it is often difficult for buyers and sellers to keep track of the details of their effort. Buyers need to react quickly to new listings, price drops, and open houses. They also need to coordinate with their agent (and possibly with co-buyers) on events like inspections, contingency removal, loans, and so on. Sellers also need to be aware of price changes that affect the market, changes to the status of nearby homes, and the like. They also need to coordinate with their agent on events like changes to their listing, buyer inspections, and so forth. Keeping track of all of these details can be overwhelming. It is easy to miss important events, milestones, or deadlines. Some of the relevant information for keeping track of these events is not publicly available. Multiple listing service (MLS) listings are not in the public domain, and third parties are not aware of the details of individual negotiations. Thus, a third party cannot easily create a summary of all data relevant to a purchase or sale.

Feeds are streams of information that are consumable by feed readers. One popular type of feed technology is really simple syndication (RSS). RSS allows visitors of websites and other sources of information to consume the information from the information source by subscribing to a feed provided by the information source (or sometimes by a third party, like feedproxy). A website includes various formatting, from where items are placed on the page (e.g., columns, whether banner ads appear at the top or bottom, and so on), to how particular page elements are formatted (e.g., font style, font size, background imagery, and so forth), to how elements react to interaction (e.g., hover events, clicking on an item, and the like). This makes it difficult for software programs that gather information from many sites, e.g., readers, to handle the varying possibilities of content style. Feeds provided by sites get around this problem by providing the information of the site, such as articles or blog posts, in a stream of text that is uniform across various sites, although feeds may still include audiovisual information such as embedded images, videos, and so on. Feeds are typically the same for all users that receive the feed. For example, two users receiving a feed of blog posts from a web log will typically receive the same set of posts.

DETAILED DESCRIPTION

Embodiments of the invention may be operational with numerous general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Embodiments of the invention may be described in the general context of computer-executable instructions, such as program modules, being executed by a computer and/or by computer-readable media on which such instructions or modules can be stored. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Embodiments of the invention may include or be implemented in a variety of computer readable media. Computer readable media can be any available media that can be accessed by a computer and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

According to one or more embodiments, the combination of software or computer-executable instructions with a computer-readable medium results in the creation of a machine or apparatus. Similarly, the execution of software or computer-executable instructions by a processing device results in the creation of a machine or apparatus, which may be distinguishable from the processing device, itself, according to an embodiment.

Correspondingly, it is to be understood that a computer-readable medium is transformed by storing software or computer-executable instructions thereon. Likewise, a processing device is transformed in the course of executing software or computer-executable instructions. Additionally, it is to be understood that a first set of data input to a processing device during, or otherwise in association with, the execution of software or computer-executable instructions by the processing device is transformed into a second set of data as a consequence of such execution. This second data set may subsequently be stored, displayed, or otherwise communicated. Such transformation, alluded to in each of the above examples, may be a consequence of, or otherwise involve, the physical alteration of portions of a computer-readable medium. Such transformation, alluded to in each of the above examples, may also be a consequence of, or otherwise involve, the physical alteration of, for example, the states of registers and/or counters associated with a processing device during execution of software or computer-executable instructions by the processing device.

As used herein, a process that is performed "automatically" may mean that the process is performed as a result of machine-executed instructions and does not, other than the establishment of user preferences, require manual effort.

A personalized feed system is described herein that provides feeds that are tailored to the preferences of each user of a real estate website or application. In some embodiments, the system provides a feed with regular (e.g., nightly or weekly) listing updates that include new listings of interest to a particular buyer. The buyer may have previously signed up with the website to receive a stored profile, and the profile may include information such as what geographical regions the buyer is interested in, what types of homes the buyer is looking for, and so on. The personalized feed system uses this information to provide a feed specific to the buyer that notifies the buyer of listings that are of particular relevance to that buyer, based on the buyer's expressed preferences or other implicitly determined information about the buyer. In some embodiments, real estate parties can subscribe to an RSS or other feed for a saved real estate search, to be notified when new items are available that meet the criteria of the search. A buyer may use this to find newly listed homes, while a seller may use this to find new competing listings.

The personalized feed system also creates a personal feed specific to each user of the real estate website. All real estate events that are relevant to the user are summarized in a single time-oriented feed (i.e., newest events may be displayed first, with older events "falling off" the list as they become stale or dated). Buyers receive information about new and/or modified listings, sales, outstanding offers, and the like, while sellers receive information about sales, new and/or modified listings, open offers, and so on. Once a buyer or seller is in the offer process, the feed displays information about progress of the transaction. Information in the feed can be read-only (e.g., a new listing), while other information can be read-write (e.g., "sign loan docs" where a user can indicate that the user signed the documents requested). Thus, the personalized feed system provides a variety of types of real estate transaction information to users in a more compact way that the users can consume in a feed-reading application of their choice or from the web.

Feeds created by the system can include information about heterogeneous real estate events (e.g., some that are MLS related, others that are deal related, others that are about public data), time oriented display or delivery of events, a comprehensive view of events related to a home search or sale, information that is personal, public, and/or proprietary data, and/or events that are interactive (e.g., check off a checkbox).

In some embodiments, a queue of feed items is stored for each user. As relevant events are discovered, a reference to the event is stored into the queue. Periodically run jobs discover and/or record items of interest for each user. For example, using a relational database, the system may include a table of listing updates, which contains a row for every change to every listing (including events like, for example, "went on market", "price changed", and "went off market"). Each row in the listing updates table has a unique identifier (e.g., a primary key). Rows in the listing updates table are not associated with individual users, but rather they are facts about each listing. However, a user may subscribe to a particular set of listing updates, which generates a query that can be run against the listing updates table to identify new events of interest to that user. For each identified event of interest, the system places a reference in a list of feed items specific to that user.

The same database might also contain a table of deals, which contains one row for each home offer handled by a real estate website. Each deal may be of interest to multiple users, such as a buyer, seller, listing agent, and/or buying agent who are all parties to a particular transaction. The system identifies deal events of interest to each user and places a reference to each event of interest in each user's individual, personalized feed. The same database may contain another table of feed items called feed_items. Each row in the table associates a user with a change or event. The feed_items table might contain columns like user_id, datetime_added, item_id, and/or item_type. The item_type column indicates the type of the item described by the row. For example, an item_type of "listing" (or an associated numeric identifier) might refer to rows in the listing updates table, while an item_type of "deals" might refer to an item in the deals table (such as the need to perform an inspection). A particular user might have a row in feed_items that refers to a particular listing update, and/or another row that refers to a particular deal, as well as other events from other categories of information tracked by the real estate site.

When displaying this information to the user, the system queries the feed_items table for recent items that are relevant to the current user. Results can be ordered by datetime_added descending, or based on other criteria. For each item, the system decodes the item_type, looks up the relevant item_id, and places the data in feed format or renders the item for display. The feed format or display may include icons, color-coding, or some other visual indicator of items of particular interest (e.g., looming deadlines).

Figure 1:
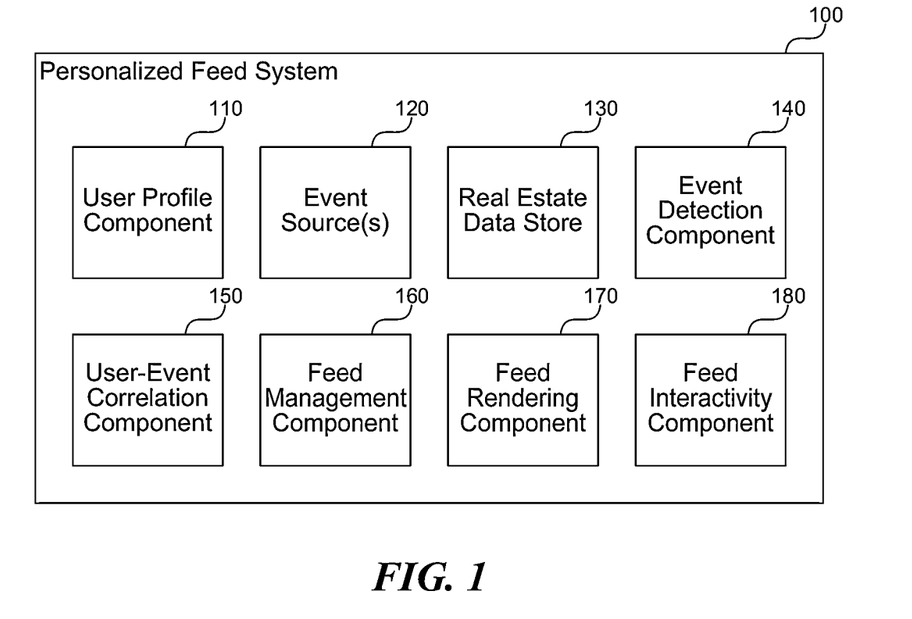
FIG. 1 is a block diagram that illustrates components of the personalized feed system, in one embodiment.

FIG. 1 is a block diagram that illustrates components of the personalized feed system, in one embodiment. The system 100 includes a user profile component 110, one or more event sources 120, a real estate data store 130, an event detection component 140, a user-event correlation component 150, a feed management component 160, a feed rendering component 170, and a feed interactivity component 180. Each of these components is described in further detail herein.

The user profile component 110 stores user profile information for one or more users of the system 100. The profile information may include information such as authentication information (e.g., a user identifier and password), contact information (e.g., an email address, phone number, postal address, and so forth), preference information (e.g., what areas a buyer is looking in for purchases, types of properties of interest, and so forth), transactions the user is a party to, and so forth. Users may also have a type tracked by the system, such as buyer, seller, service provider, agent, and the like. Any user may operate in several categories at the same time, and may be associated with events related to each. For example, a person may be selling a house in one area while buying a house in another. In some cases, the system may create separate feeds or classifications of events in a feed that allow a user to see events related to only one particular scope at some times and all events at others, upon request.

The one or more event sources 120 include various sources of real estate related information. These may include data streams from a multiple listing service (MLS), a county information data stream (e.g., sales data, assessor information, tax payments, and the like), transaction information, broker/agent information, and so forth. The real estate website may use these sources of data for everyday operation of the website, such as to provide real estate searches, property information, value estimates, or other purposes. The personalized feed system described herein uses these event sources to identify and record events of interest for each user of the real estate website.

The real estate data store 130 is a data storage facility that stores information from the event sources, user profile information, and/or user-to-event association information. The data storage facility may include one or more files, file systems, hard drives, databases, cloud based storage services, or other facilities for storing data persistently over time. For example, the real estate data store 130 may be implemented as a relational database with various tables related to users, properties, transactions, events, and so forth. The system 100 may use queries or other data access methods to periodically identify information stored in the data store 130 that may be of interest to each user, and to update a set of feed items associated with each user. In some cases, for efficiency the system may determine groups of users with similar characteristics (e.g., each looking for a similar home in the same area), and perform a unified query to identify events for the group. Although some actions for multiple users may be performed together, the system 100 provides a high level of personalization such that each user may have a different set of events in the user's personalized feed by the time event detection along all axes for a user is complete.

The event detection component 140 detects events from the event sources 120 and/or stores the events in the real estate data store 130. The event detection component 140 may detect events from an MLS, such as price increases, changes in status of a listing (e.g., from "for sale" to "under contract" to "pending" to "sold"), new photos available, changes in agent remarks about a listing, notes from a buyer or seller's own agent to the buyer or seller, and/or so forth. The component 140 may also detect events from other sources, such as a change in assessment or tax value from a county data stream, a rise in the level of interest indicated by page views on a real estate site, new transaction information available from a broker's transaction data stream, or any other event deemed relevant by an implementer of the system 100. The component 140 then stores these events in the real estate data store 130, either with complete information or with a sufficient amount of reference information to retrieve further information about the event later. The component 140 may store type or source information that indicates where the event came from and/or what type of event it is that is useful later for identifying and/or culling events relevant to a particular user's feed.

The user-event correlation component 150 periodically analyzes the real estate data store 130 to identify events relevant to particular users and/or to associate those events with the particular users. For example if a particular user is party to a transaction (e.g., a purchase and sale transaction), then the component 150 associates any new events related to the transaction with the user. The user may be a buyer, seller, agent, service provider, or other user related to the transaction. The component 150 may work in conjunction with configuration stored in a user's profile that specifies types of events that a particular user is interested in receiving in his or her feed. For example, a service provider or agent may receive a large number of events, and may want to configure his or her profile so that not all events are place in his or her feed, while a buyer or seller that is rarely involved in transactions may want to receive every event relevant to that user. The user-event correlation component 150 may search (e.g., via a query) various sub-stores of the data store 130, such as tables for listings, transactions, and so forth, to identify events relevant to particular users. The component 150 may regularly run a process for each user that identifies events of relevance to that user, or may group users where the data to be identified for each user is similar (e.g., same types of listings in a given area). The result is a set of events associated with each user that the user did not have to expend effort to go out and find, and that are waiting for the user to view in a feed-based format when the user next visits the site or uses an appropriate feed reading program.

The feed management component 160 manages a personalized feed for each user of the system 100. The feed for each user includes events of particular relevance to that user, and may include broad public data, such as available listings, as well as private data available to a real estate web site, such as events in a transaction to which the user is a party. The feed management component 160 takes the events identified by the user-event correlation component 150, and places those events in the format of a feed, such as an RSS feed or historical web log. After the user-event correlation component 150 runs, the real estate data store 130 may include a table that correlates user identifiers with event types and/or references. The job of the feed management component 160 is then to access each of the event references associated with a particular user, retrieve the referred to information, and format the information in feed format. This may include making formatting of the content in an event reference uniform, retrieving data items from other tables of the real estate data store 130 or external data streams, and so forth. The component 160 may provide a uniform resource locator (URL) or other endpoint that each user can use to access his or her latest feed items at any time (e.g., http://www.redfin- .com/user/myfeed/). The component 160 may also track which feed items a user has seen before, such that a user can view only unread or new items to reduce clutter, or can save items (e.g., "starring" those items) to keep them available for viewing.

The feed rendering component 170 renders the personalized feed for a given user upon request by the user. Rendering may include displaying a web page with the feed items for the user, or displaying the feed items in a feed reader or similar software program separate from an implementer of the system's website. Feeds for readers are often delivered in extensible markup language (XML) format, though other formats can be used. In such cases, a real estate website implementing the system may provide a URL at which a feed reader can receive an XML version of the feed for display in the reader program. The user may authenticate by providing authentication information (e.g., a username and password), so that the website can access that user's profile and/or personalized feed items. The user's authentication information or equivalent credentials may also be stored in a cookie by the user's web browser or feed reading program so that subsequent visits to the site do not request logon information interactively from the user.

The feed interactivity component 180 handles user interaction with interactive feed items in the user's personalized feed. Feed items may be actionable, such as requesting that a user sign a document, check a checkbox, or perform some other action related to an event in the user's personalized feed. For example, during a purchase and sale transaction, a buyer's agent may ask the buyer whether the buyer would like a termite inspection during closing, and the buyer can respond directly from his or her feed by selecting yes or no. This allows a user to very quickly see all of the events that request user input in a flowing feed-based format, respond to them all, and then continue with other activities. For a user such as an agent, that may be simultaneously handling multiple transactions, this can be a particularly efficient way to handle and respond to requests. The feed interactivity component 180 receives the user interaction and may create additional events related to the response in other users' feeds. For example, if a buyer responds to his or her agent that a termite inspection is requested during closing, then the component 180 may place a response entry in the agent's feed that indicates the buyer's answer.

Figure 2:
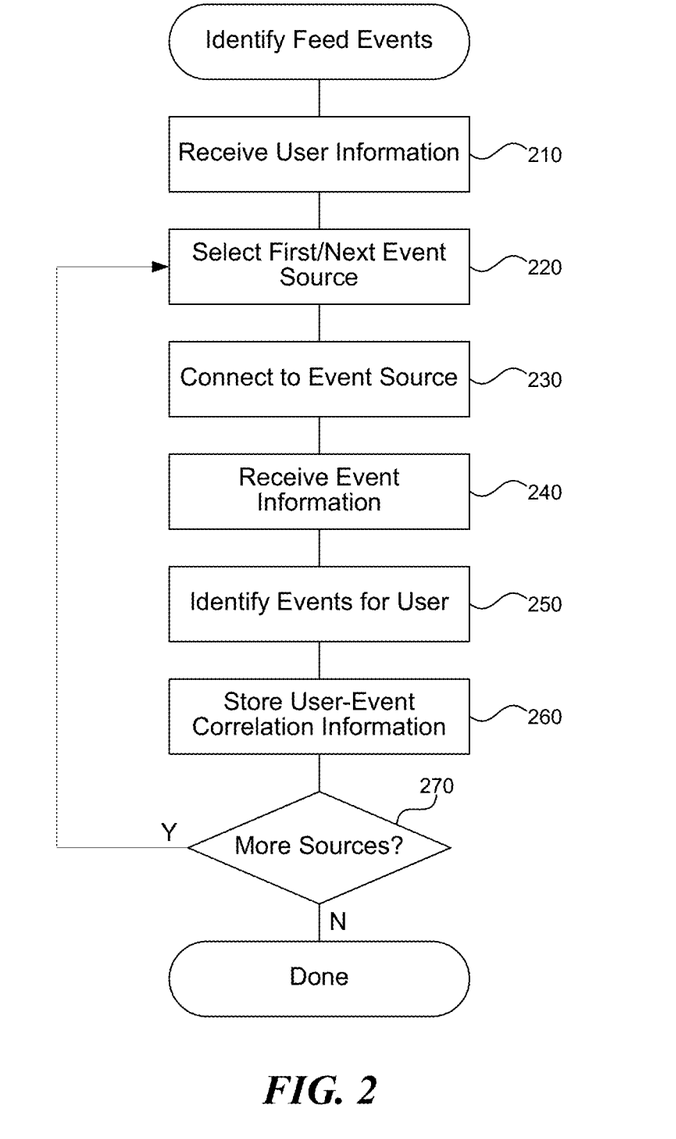
FIG. 2 is a flow diagram that illustrates processing of the personalized feed system to receive and correlate feed events for a user, in one embodiment.

FIG. 2 is a flow diagram that illustrates processing of the personalized feed system to receive and correlate feed events for a user, in one embodiment. Beginning in block 210, the system receives user information that specifies one or more event types of real estate information of interest to a user. The system may access a stored user profile for a user to identify configuration information that may specify one or more real estate searches for properties, one or more transactions to which the user is a party, and other real estate events (e.g., open houses). The configuration information may identify events of interest that may be placed in a personalized feed associated with the user as well as events not of interest or that the user does not want to receive in his or her feed. The system may perform these steps for a large group of users of a real estate website or other application. The system may update feeds for users serially, for many users at the same time in parallel, according to a schedule of when the system is less busy, or according to any other schedule that a particular implementer of the system chooses to meet the goals described herein.

Continuing in block 220, the system selects an event source from which the system receives a data stream of real estate information. The system may receive real estate data from a variety of data sources, such as multiple listing services, county tax data sources, transaction data sources, broker data sources, geographic information sources, neighborhood information sources, and so forth. The system may periodically retrieve information from these data sources as part of a separate process to keep up to date real estate information on a real estate search website or other application. The system then also leverages this information to provide personalized feeds for users of the website or application.

Continuing in block 230, the system connects to the selected event source. The event source may provide a website of its own, a web service application-programming interface (API), a file transfer protocol (FTP) site, a remote database connection, or data sharing protocol to which the system can connect to receive new data. The system connects according to the protocol of the particular source, and retrieves new data from that source. The system may do this for each of a series of sources to update a local data store of aggregate real estate information (e.g., information from multiple sources about a set of properties).

Continuing in block 240, the system receives event information from the connected event source. The system may receive information in one format, such as bulk information about each of the tax parcels in a county, and then may separate this information into individual events (e.g., property A's tax assessed value increased). The system may then store these events in an events table or other data structure of a data store, such as a relational database. The system may also store the bulk data and later extract events by querying one or more records associated with the bulk data. For example, the system may compare two sets of bulk data from different times to form a "diff" view of items that differ, and then turn these differences into events. In some cases, a failure to change may also be an event, such as an unsold property with a listing price that has not dropped in more than 60 days. The system can create events for any data occurrence of interest to a particular implementation of the system.

Continuing in block 250, the system identifies events for the user, based on the received user information and/or the received event information. An event of interest to a user may include any listing changes (or lack of changes) for listings that satisfy a real estate search query saved by the user in the user's profile, events related to a transaction to which the user is a party, events based on behavior of other users (e.g., properties going under contract have risen in an area), and so forth. The system identifies events by matching all of the available event data streams to preference and/or other configuration information known about the user.

Continuing in block 260, the system stores correlation information that associates the user with events identified for that user. The correlation information may include the actual event data, such as a text or other description of the event, or reference information from which the system can later retrieve or generate the full event information. For example, if a listing changed in price, the system may store a reference to a listing data store with an indication that the price change is the event being referenced. Later, when the feed is rendered the system can then access any referenced event from their respective event sources, and create a complete event record for display to the user. The stored user-event correlation information may also include other data, such as whether a user has seen or "read" a particular correlated item, whether a response is expected or requested from the user, and so on.

Continuing in decision block 270, if there are more event sources then the system loops to block 220 to select the next event source from which to retrieve event information. Although shown serially for ease of explanation and clarity, those of ordinary skill in the art will recognize that the system may pull data from multiple event sources in parallel and process information from each at the same time or in an overlapping manner. Doing so may increase the efficiency of the system or increase the ability of the system to perform background work at times when the system is less busy with interactive user sessions (e.g., late at night). After block 270, these steps conclude.

Figure 3:
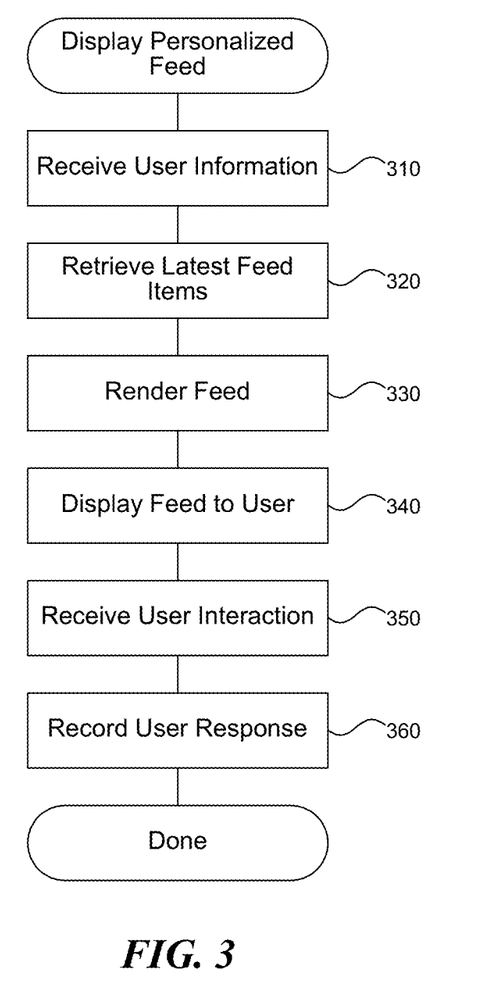
FIG. 3 is a flow diagram that illustrates processing of the personalized feed system to display a personalized user feed, in one embodiment.

FIG. 3 is a flow diagram that illustrates processing of the personalized feed system to display a personalized user feed, in one embodiment. Beginning in block 310, the system receives user information that identifies a particular user requesting to display the user's personalized user feed of real estate events that have occurred in a particular period. For example, the user may authenticate with the system either by providing interactive logon information or by uploading cryptographic information stored in a cookie on the user's computing device (e.g., a computer or smartphone). The feed may include events that have occurred since the user last logged on, events that the user has flagged to stay in the feed, events that are pending a user response or other interaction, and so forth.

Continuing in block 320, the system retrieves one or more latest feed items that represent events that have occurred in the time period specified. The system may automatically display to the user those events that have occurred in a predefined period (e.g., since the user last logged on, events in the last 7 days, and so on), or may allow the user to select a period of interest (e.g., the last 30 days). The system retrieves the feed items from a data store of events correlated with the particular user, such as by the process described with reference to FIG. 2. The feed items may be stored in a table of a relational database or other data store from which the items can be queried to identify those items relevant for displaying to the user.

Continuing in block 330, the system renders a feed that mixes feed items from multiple data sources in a uniform format for display in a feed format that is different from the native format of the underlying information. For example, a change in listing price that was originally displayed in a multiple listing service listing page may be rendered as a short text description that specifies the address, previous listing price, and/or new listing price of a property. The system may provide this information in XML or another format that complies with a well-known feed standard such as RSS, atom, or other feed formats. Although feed items may include audiovisual information such as pictures and/or video, a feed item often excludes information that may have been present on the original information such as navigation controls for a website, banner advertisements, and so forth. While this makes the information more compact and convenient for user consumption, many feeds attempt to reintroduce this information by placing links to the source site in the feed items and inserting feed items specifically for advertisements to be placed inline in the feed. Where preferred by a particular implementation of the system, the system may modify the feed in this way also.

Continuing in block 340, the system displays the rendered feed to the user. The system may provide a web page that renders a particular user's feed as well as providing a URL or other source from which the user can retrieve the feed for display in other software, such as a feed reading program. In such cases, the feed reading program displays the rendered feed to the user, and the system provides the underlying data in the appropriate feed format (e.g., RSS via XML). The system may display the feed to the user as a list of time-oriented items, much like an inbox of email messages or other time-based listings. This allows the user to consume many events in a common format for going through large amounts of information in one place, rather than having to visit each source of information separate. Thus, by reading a feed of 5-10 items, the user may avoid visiting 5-10 separate web pages to receive the same information.

Continuing in block 350, the system receives a user interaction with an interactive feed item in the displayed feed that requests a user response. For example, a feed item may include an event from a user's agent related to a transaction in which the user is the buyer. The event may ask the user to sign a purchase and sale agreement for an offer, select an inspector for a home inspection, select a lender to provide financing, select a closing escrow company, and so forth. Earlier in the process of finding a house, an agent may send inquiries such as whether a user that is a buyer likes a particular style of living room or house layout. These and other feed items form read-write, interactive feed items to which the user provides a response by interacting with one, or more displayed controls.

Continuing in block 360, the system records a response indicated by the user interaction and provides the response to a requesting party. The system may provide the response as a feed item in another user's feed, such as the feed of an agent associated with the buyer. In this way, the recipient of the response can also manage information via his or her personalized feed, and can potentially handle many such responses in a short amount of time due to the more compact format provided by feeds. After block 360, these steps conclude.

Figure 4:
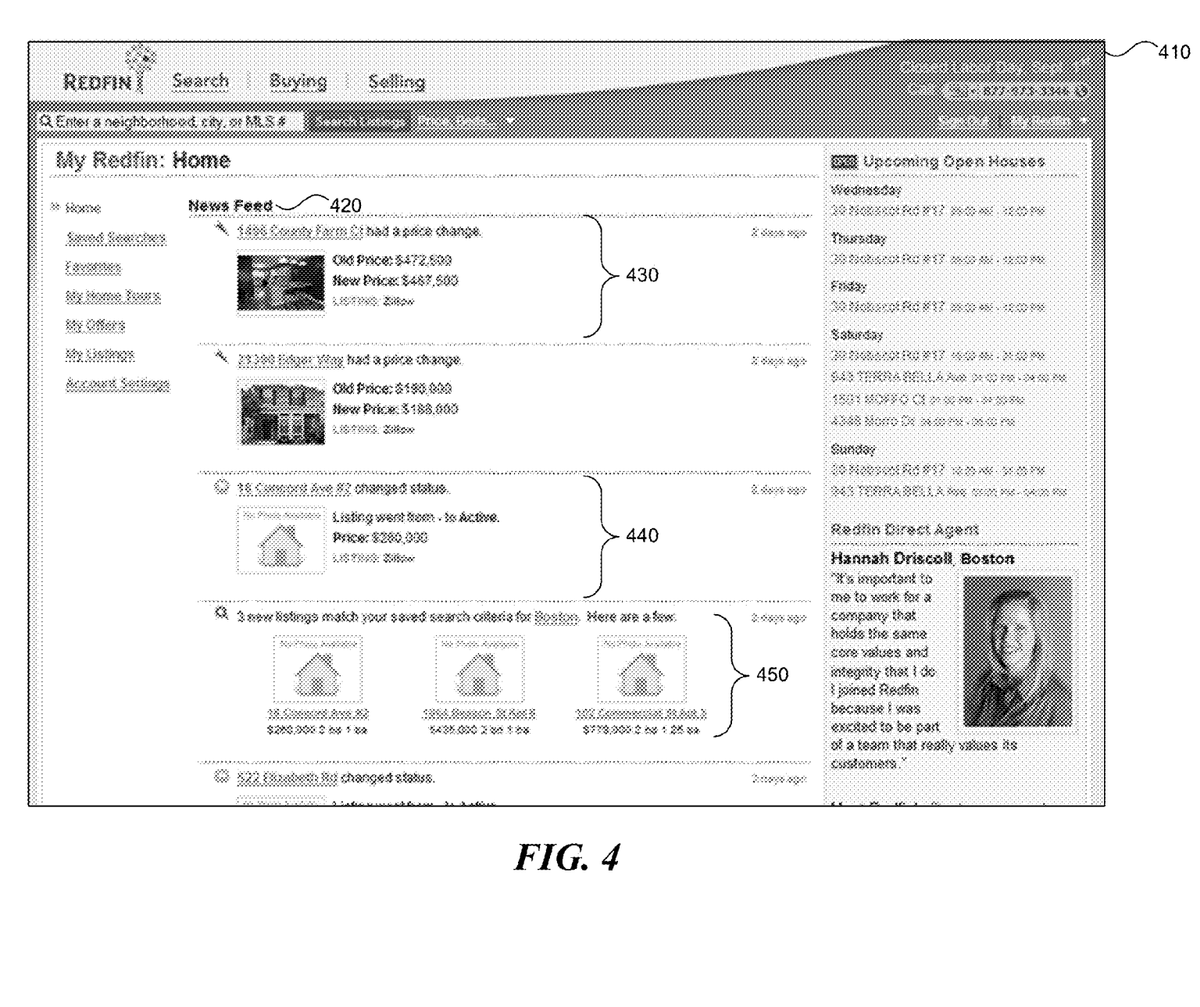
FIG. 4 is a display diagram that illustrates a personalized user feed rendered by the personalized feed system, in one embodiment.

FIG. 4 is a display diagram that illustrates a personalized user feed rendered by the personalized feed system, in one embodiment. The display page 410 shows a personalized feed 420 for a user that has logged into a website provided by a real estate company. The personalized feed 420 contains various feed items, such as a first item 430 that indicates that a listing of interest to the user has decreased in price. A second feed item 440 indicates that another listing has changed in status. Still another feed item 450 indicates that three new listings match a saved search for the user. Each of these feed items represent different types of information, and potentially come from different sources, but because of the personalized feed system, the user is able to gather and consume all of these events of interest to the user in one place, the personalized feed. From the personalized feed, the user can select hyperlinks embedded in each feed item to view a detail page related to that item.

From the foregoing, it will be appreciated that specific embodiments of the personalized feed system have been described herein for purposes of illustration, but that various modifications may be made without deviating from the spirit and scope of the invention. Accordingly, the invention is not limited except as by the appended claims.

The invention claimed is:

1. A computer-implemented method of providing a personalized real estate data feed for a user, the method comprising:

receiving user information that specifies one or more types of events of a plurality of events, each said event comprising a respective corresponding modification to a listing of a parcel of real property;

selecting an event source from which real estate information can be received;

connecting to the selected event source;
receiving from the selected event source one or more indications that one or more events of said plurality of events have occurred;
based on the received user information and the received indications, identifying events of which to notify the user;
automatically formatting in extensible markup language a feed item describing at least one of the events;
detecting a feed reader application installed on a computing device associated with the user;
in response to identifying at least one of the events of which to notify the user, providing to the computing device a uniform resource locator (URL) enabling the feed reader to access the formatted feed item and the user to view on the computing device at least one of the events; and
storing correlation information that associates the user with one or more of said identified events, wherein the preceding steps are performed by at least one processor.

2. The method of claim 1 wherein receiving user information comprises accessing a stored user profile for a user to identify configuration information that specifies one or more types of real estate events.

3. The method of claim 1 wherein receiving user information comprises receiving one or more event types to ignore for a user and not place in a personalized feed for the user.

4. The method of claim 1 wherein selecting the event source comprises receiving information from a source selected from the group consisting of a multiple listing service, a county tax data source, a transaction data source, a broker data source, a geographic information source, and a neighborhood information source.

5. The method of claim 1 wherein selecting the event source comprises periodically retrieving information from multiple data sources as part of a separate process to keep up to date real estate information on a real estate search website.

6. The method of claim 1 wherein connecting to the selected event source comprises at least one of accessing a website associated with the event source, invoking a web service application programming interface (API) of the event source, accessing, a file transfer protocol (FTP) site of the event source, or establishing a remote database connection with the event source.

7. The method of claim 1 wherein receiving one or more indications comprises separating the event information into individual events and storing the separate events in an events data structure of a data store.

8. The method of claim 1 wherein receiving one or more indications comprises storing bulk data retrieved from the event source and later extracting events by querying one or more records associated with the bulk data.

9. The method of claim 1 wherein receiving one or more indications comprises defining as an event data that has not changed for a specified period of time.

10. The method of claim 1 wherein identifying events comprises comparing information in the user's profile with the received event information to identify one or more events that correlate with a type of event of interest to the user.

11. The method of claim 1 wherein storing correlation information comprises storing reference information from which detailed event information can later be retrieved.

12. The method of claim 1 wherein storing correlation information comprises marking each event with an indication of whether a response is requested from the user to each event.

13. The method of claim 1 further comprising performing the method for each of a plurality of event sources to correlate events from each event source with the user's profile information.

14. A computer system for providing a personalized real estate event feed, the system comprising:
a processor and memory configured to execute software instructions embodied within the following components;
a user profile component that stores user profile information for one or more users of the system;
a real estate data store that stores information from one or more event sources that include various sources of real estate related information, user profile information, and user-to-event association information;
an event detection component that detects separate events from the event sources and stores the events in the real estate data store, each said event comprising a respective corresponding modification to a listing of a parcel of real property;
a user-event correlation component that periodically analyzes the real estate data store to identify events relevant to particular users and to associate those events with the particular users;
a feed rendering component that automatically formats in extensible markup language feed items describing at least one of the events;
a feed management component that manages a personalized feed for each user of the system, wherein the personalized feed includes feed items based on the identified events for each particular user in response to identifying at least one event relevant to a particular user, the feed management component detecting a feed reader application installed on a computing device associated with the user, the feed management component further providing to the computing device a uniform resource locator (URL) enabling the feed reader to access the formatted feed item and the user to view on the computing device the at least one event; and
a feed interactivity component that handles user interaction with interactive feed items in the user's personalized feed, wherein an interactive feed item can receive a response from the user.

15. The system of claim 14 wherein the user profile information comprises authentication information, preference information that indicates a type of real estate the user is interested in, and one or more transactions the user is a party to.

16. The system of claim 14 wherein the event sources comprise at least one of data streams from a multiple listing service, a county information data stream, and transaction information from a real estate broker from which the system identifies and records events of interest for each user of a real estate website.

17. The system of claim 14 wherein the event detection component identifies separate events based on comparing an earlier version of information received from an event source with a later version and detecting changes between the two versions, wherein each change is classified as a separate event.

18. The system of claim 14 wherein the user-event correlation component produces a set of events associated with each user that the user did not have to manually find, and that are waiting for the user to view in a feed-based format when the user next accesses the system.

19. The system of claim 14 wherein rendering a feed for a user comprises placing the feed items of the user's personalized feed in a time-oriented, uniform format according to a well-known standard for consuming data feeds.

20. A non-transitory computer-readable storage medium comprising instructions for controlling a computer system to display a personalized user feed for a user of a real estate application, wherein the instructions, upon execution, cause a processor to perform actions comprising:

receiving user information that identifies a particular user requesting to display the user's personalized user feed of real estate events that have occurred in a particular time period, each said event comprising a respective corresponding modification to a listing of a parcel of real property;

retrieving one or more latest feed items that represent events that have occurred in the time period specified;

rendering a feed that mixes feed items from multiple data sources in a uniform format for display in a feed format that is different than the native format of the underlying information;

automatically formatting the feed in extensible markup language;

detecting a feed reader application installed on a computer system associated with the user;

in response to retrieving at least one of the feed items, providing to the user computer system a uniform resource locator (URL) enabling the feed reader to access the formatted feed and the user to view on the user computer system at least one of the feed items;

in response to the computing device accessing the URL, displaying the rendered feed to the user;

receiving a user interaction with an interactive feed item in the displayed feed that requests a user response; and recording a response indicated by the user interaction and providing the response to a requesting party.

\* \* \* \* \*